United States Patent
Calcev et al.

(10) Patent No.: US 9,872,230 B2
(45) Date of Patent: Jan. 16, 2018

(54) SYSTEM AND METHOD FOR EFFICIENT COMMUNICATIONS SYSTEM SCANNING

(71) Applicant: FutureWei Technologies, Inc., Plano, TX (US)

(72) Inventors: George Calcev, Hoffman Estates, IL (US); Bin Chen, Schaumburg, IL (US); Hanan Ahmed, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 63 days.

(21) Appl. No.: 14/057,966

(22) Filed: Oct. 18, 2013

(65) Prior Publication Data

US 2014/0112327 A1    Apr. 24, 2014

Related U.S. Application Data

(60) Provisional application No. 61/716,235, filed on Oct. 19, 2012.

(51) Int. Cl.
*H04W 48/14* (2009.01)
*H04W 48/16* (2009.01)
*H04W 48/20* (2009.01)

(52) U.S. Cl.
CPC ............ *H04W 48/14* (2013.01); *H04W 48/16* (2013.01); *H04W 48/20* (2013.01)

(58) Field of Classification Search
CPC ...... H04W 48/14; H04W 48/16; H04W 48/20
See application file for complete search history.

(56) References Cited

U.S. PATENT DOCUMENTS

| | | |
|---|---|---|
| 2005/0130658 A1 | 6/2005 | Stephens |
| 2007/0064655 A1 | 3/2007 | Ruuska |
| 2007/0064660 A1* | 3/2007 | Qi et al. .................... 370/338 |
| 2010/0313020 A1 | 12/2010 | Montemurro |
| 2011/0130149 A1 | 6/2011 | Yao et al. |
| 2011/0205910 A1 | 8/2011 | Soomro et al. |
| 2011/0280180 A1 | 11/2011 | McCann et al. |
| 2011/0280225 A1 | 11/2011 | Chen |
| 2011/0280228 A1 | 11/2011 | McCann et al. |
| 2011/0299481 A1 | 12/2011 | Kim et al. |
| 2012/0076117 A1 | 3/2012 | Montemurro et al. |

(Continued)

FOREIGN PATENT DOCUMENTS

| | | |
|---|---|---|
| CN | 103096422 A | 5/2013 |
| EP | 2120369 A1 | 11/2009 |

(Continued)

OTHER PUBLICATIONS

IEEE, "Modification to the Amendment Text of white list of multiple APs GAS Query," That IEEE P802.11 Wireless LANs, IEEE 802.11-12/xxxxr0, Jan. 2013, 5 pages.

(Continued)

*Primary Examiner* — Walter Divito
(74) *Attorney, Agent, or Firm* — Slater Matsil, LLP

(57) ABSTRACT

A method for wireless communications includes generating a composed query for obtaining information about a subset of neighboring stations of a responding station which satisfy the composed query, the composed query including a logical combination of attributes and values, and transmitting the composed query to the responding station. The method also includes receiving the information.

23 Claims, 10 Drawing Sheets

(56) References Cited

U.S. PATENT DOCUMENTS

| | | | |
|---|---|---|---|
| 2012/0076118 A1 | 3/2012 | Montemurro et al. | |
| 2012/0207102 A1* | 8/2012 | Martin | H04W 74/008 |
| | | | 370/329 |
| 2013/0070644 A1 | 3/2013 | McCann et al. | |
| 2013/0107757 A1 | 5/2013 | Cherian et al. | |
| 2013/0281093 A1* | 10/2013 | Jung | H04W 52/38 |
| | | | 455/436 |
| 2013/0316705 A1 | 11/2013 | Kneckt et al. | |

FOREIGN PATENT DOCUMENTS

| | | | |
|---|---|---|---|
| JP | 2009506698 A | 2/2009 | |
| JP | 2009509374 A | 3/2009 | |
| JP | 2009539296 A | 11/2009 | |
| WO | 2004098214 A1 | 11/2004 | |
| WO | 2007029109 A2 | 3/2007 | |
| WO | 2007031855 A2 | 3/2007 | |
| WO | 2007040805 A1 | 4/2007 | |
| WO | 2010139058 A1 | 12/2010 | |
| WO | 2012061504 A2 | 5/2012 | |
| WO | 2012142437 A1 | 10/2012 | |

OTHER PUBLICATIONS

IEEE, "Draft Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 7: Fast Initial Link Setup," IEEE P802.11ai/DO.5, Mar. 2013, 106 pages.

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Standards Association; IEEE Std 802.11-2012 (Revision of IEEE Std 802.11-2007), Mar. 29, 2012, 2793 pages.

IEEE, "P802.11ai/DO.2 Draft Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 7: Fast Initial Link Setup," IEEE P802.11ai/DO.2, Nov. 2012, 84 pages.

"Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: TV White Spaces Operation," IEEE P802.11af™/D2.0, 802.11 Working Group of the 802 Committee, Jul. 2012, Sections: 8.4.4 Access Network Query Protocol (ANQP) Elements, 8.4.4.18 Neighbor Report ANQP-Element and10.24.1 Gas Protocol, 22 pages.

"IEEE Standard for Information Technology—Telecommunications and information exchange between systems—Local and Metropolitan area networks—Specific requirements, Part 11: Wirless LAN Medium Access Control (MAC) and Physical Layer (PHY) Specifications," IEEE Draft P802.11-REVmb™/D12, LAN/MAN Standards Committee of the IEEE Computer Society, Nov. 2011, Section: 8.4.5, 323 pages.

International Search Report and Written Opinion of Patent Cooperation Treaty (PCT), International Application No. PCT/CN2013/090115, Applicant Huawei Technologies, Co., Ltd., dated Mar. 27, 2014, 10 pages.

International Search Report and Written Opinion of Patent Cooperation Treaty (PCT), International Application No. PCT/US2013/065743, Applicant Huawei Technologies, Co., Ltd., dated Feb. 5, 2014, 11 pages.

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Standards Association; IEEE Std 802.11-2012 (Revision of IEEE Std 802.11-2007), XP-002747757, Mar. 29, 2012, 42 pages.

* cited by examiner

SYSTEM AND METHOD FOR EFFICIENT COMMUNICATIONS SYSTEM SCANNING

This application claims the benefit of U.S. Provisional Application No. 61/716,235, filed on Oct. 19, 2012, entitled "System and Method for GAS and ANQP Extension," which application is hereby incorporated herein by reference.

TECHNICAL FIELD

The present disclosure relates generally to digital communications, and more particularly to a system and method for efficient communications system scanning.

BACKGROUND

In an IEEE 802.11 compliant communications system, also commonly referred to as a Wi-Fi communications system, when a user chooses to connect to the Wi-Fi communications system, the user's device scans for available access points (APs). The APs may also be commonly referred to as hotspots, base stations, communications controllers, NodeBs, evolved NodeBs, and the like. The user's device may also be commonly referred to as mobiles, mobile stations, terminals, subscribers, user equipment, and the like. The scanning performed by the user's device may discover different features and available services of the Wi-Fi communications system. The user's device may proceed with an authentication process. The scanning process may take an extended amount of time, especially when there are multiple APs available.

SUMMARY OF THE DISCLOSURE

Example embodiments of the present disclosure which provide a system and method for efficient communications system scanning.

In accordance with an example embodiment of the present disclosure, a method for wireless communications is provided. The method includes generating, by a requesting station, a composed query for obtaining information about a subset of neighboring stations of a responding station which satisfy the composed query, the composed query including a logical combination of attributes and values. The method also includes transmitting, by the requesting station, the composed query to the responding station, and receiving, by the requesting station, the information.

In accordance with another example embodiment of the present disclosure, a method for wireless communications is provided. The method includes receiving, by a responding station, a composed query for obtaining information about a subset of neighboring stations of the responding station which satisfy the composed query, the composed query including a logical combination of attributes and values The method also includes generating, by the responding station, the information, and transmitting, by the responding station, the information to a requesting station.

In accordance with another example embodiment of the present disclosure, a requesting station is provided. The requesting station includes a processor, a transmitter operatively coupled to the processor, and a receiver operatively coupled to the processor. The processor generates a composed query for obtaining information about a subset of neighboring stations of a responding station which satisfy the composed query, the composed query including a logical combination of attributes and values. The transmitter transmits the composed query to the responding station. The receiver receives the information.

In accordance with another example embodiment of the present disclosure, a responding station is provided. The responding station includes a receiver, a processor operatively coupled to the receiver, and a transmitter operatively coupled to the processor. The receiver receives a composed query for obtaining information about a subset of neighboring stations of the responding station which satisfy the composed query, the composed query including a logical combination of attributes and values. The processor generates the information. The transmitter transmits the information to a requesting station.

One advantage of an embodiment is that extensions to communications protocols permit a device to obtain information about multiple APs using a single composed query. The use of the single composed query helps to reduce communications overhead, latency, and probability of transmission collisions, thereby shortening the scanning process.

Another advantage of an embodiment is that the scanning process is shortened. Therefore, network discovery and selection for the purpose of association and/or handover are also shortened.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to efficient communications system scanning. For example, a requesting station generates a composed query for obtaining information about a subset of neighboring stations of a responding station which satisfy the composed query, transmits the composed query to the responding station, and receives the information. As another example, a responding station receives a composed query for obtaining information about a subset of neighboring stations of the responding station which satisfy the composed query, generates the information, and transmits the information to a requesting station.

The present disclosure will be described with respect to example embodiments in a specific context, namely an IEEE 802.11 compliant communications system that uses scanning of APs to obtain information about available features and services. The disclosure may also be applied, however, to other standards compliant and non-standards communications systems that use scanning to obtain information about available features and services, as well as for obtaining location information.

Figure 1:
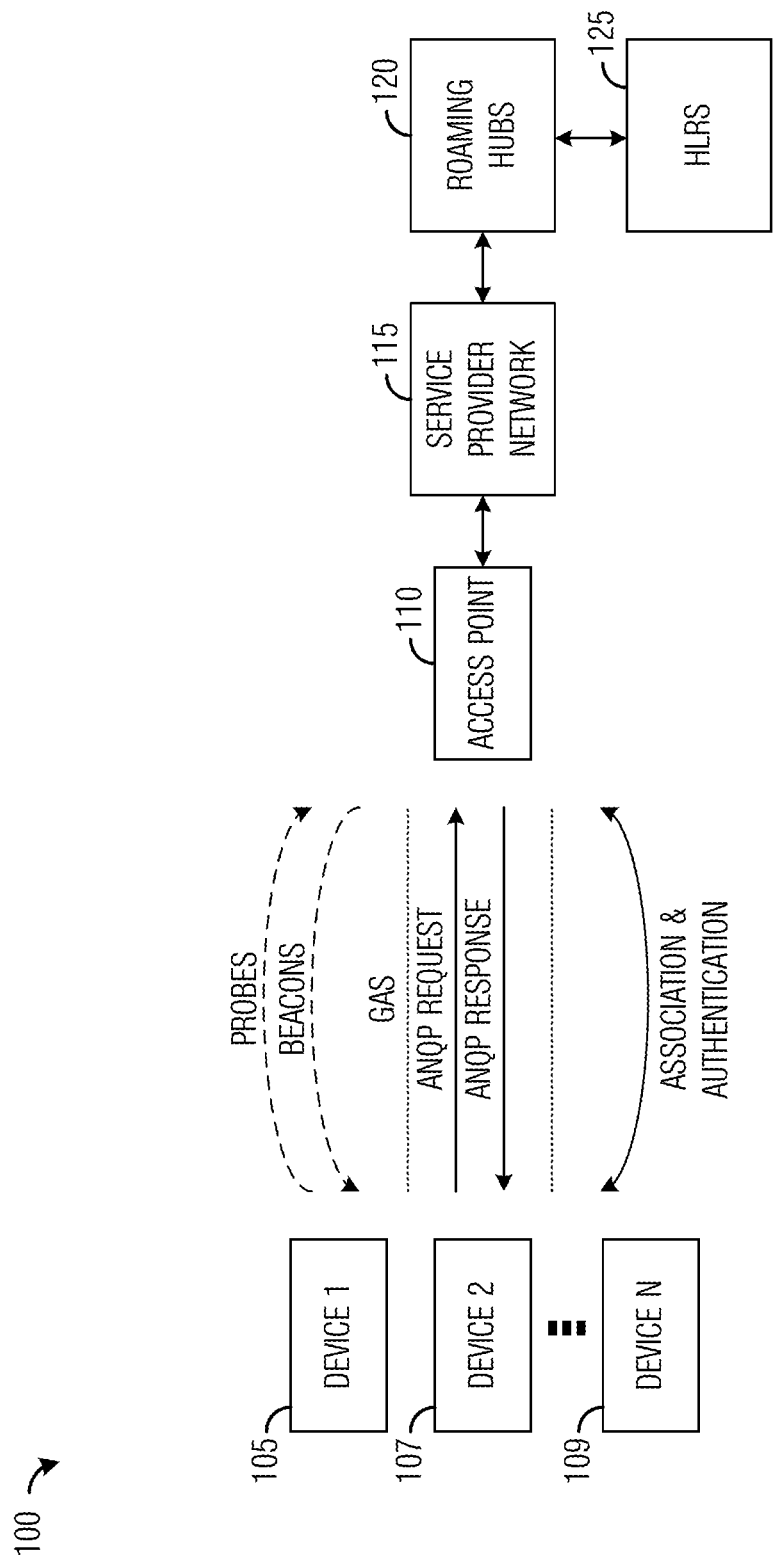
FIG. 1 illustrates an example communications system according to example embodiments described herein.

FIG. 1 illustrates an example communications system 100. Communications system 100 may be an example of a Wi-Fi compliant communications system. Communications system 100 may utilize communications services and protocols, such as generic advertisement service (GAS) and access network query protocol (ANQP), to support operations including scanning. In general, GAS may be used to provide Layer 2 transport of an advertisement protocol's frames, such as ANQP frames, between a terminal and a server in a communications system, such as communications system 100, prior to or post authentication (of the terminal, for example). Typically, ANQP may be used to discover different features and/or services of the communications system. A device compares the information regarding different networks or access points to select the best suitable to associate. The device may proceed with an authentication process.

While it is understood that communications systems may employ multiple APs capable of communicating with a number of devices, only a single AP, and a number of devices are illustrated for simplicity.

Usually, a station may be used to refer to any of the devices (such as devices 105, 107, and 109) shown in FIG. 1, which may include a cell phone, a laptop computer, a tablet, a smart sensor, a handheld or consumer electronic device, as well as other devices that have an interface (such as a Wi-Fi interface) that can interact with communications system 100. Some or all of the stations may also be able to interact with other types of communications systems, such as cellular networks, Bluetooth, proprietary networks, and the like.

An AP 110 and one or more stations may form a basic service set (BSS), which is the basic building block of a Wi-Fi communications system. A BSS may be identified by a service set identifier (SSID), which is a configured identifier and may be broadcasted by an AP of the BSS, such as AP 110. AP 110 may communicate with an AP controller or/and an ANQP server, which can be co-located or not with AP 110. AP 110 may be connected to a service provider network 115, which is connected to one or more roaming hubs 120. Roaming hubs 120 may be connected to home location register (HLRs) 125. Roaming hubs 120 and HLRs 125 provide support for device mobility, i.e., roaming.

A station may be able to request a neighbor report from an associated AP. As shown in FIG. 1, the station may request the neighbor report using a GAS message including an ANQP request and the associated AP may provide the report using a GAS message including an ANQP response. The neighbor report may contain information about neighbor AP candidates usable for fast transition. However, the information in the neighbor report may be specific for use in a fast transition procedure and not suitable for network discovery and selection before association, i.e., scanning.

Interworking procedures with GAS to enable network selection for stations when a parameter (dot11-InterworkingServiceActivated) is set to a true value have been described. GAS may be used to provide transport mechanisms for advertisement services while stations are in an unassociated state as well as in an associated state. Class-1 frames, such as Public Action management frames, may be used as the transport mechanisms. GAS messages may be transmitted using individually addressed Public Action frames, and when management frame protection is negotiated, individually addressed Protected Dual of Public Action frames may be used in place of individually addressed Public Action frames.

Figure 2:
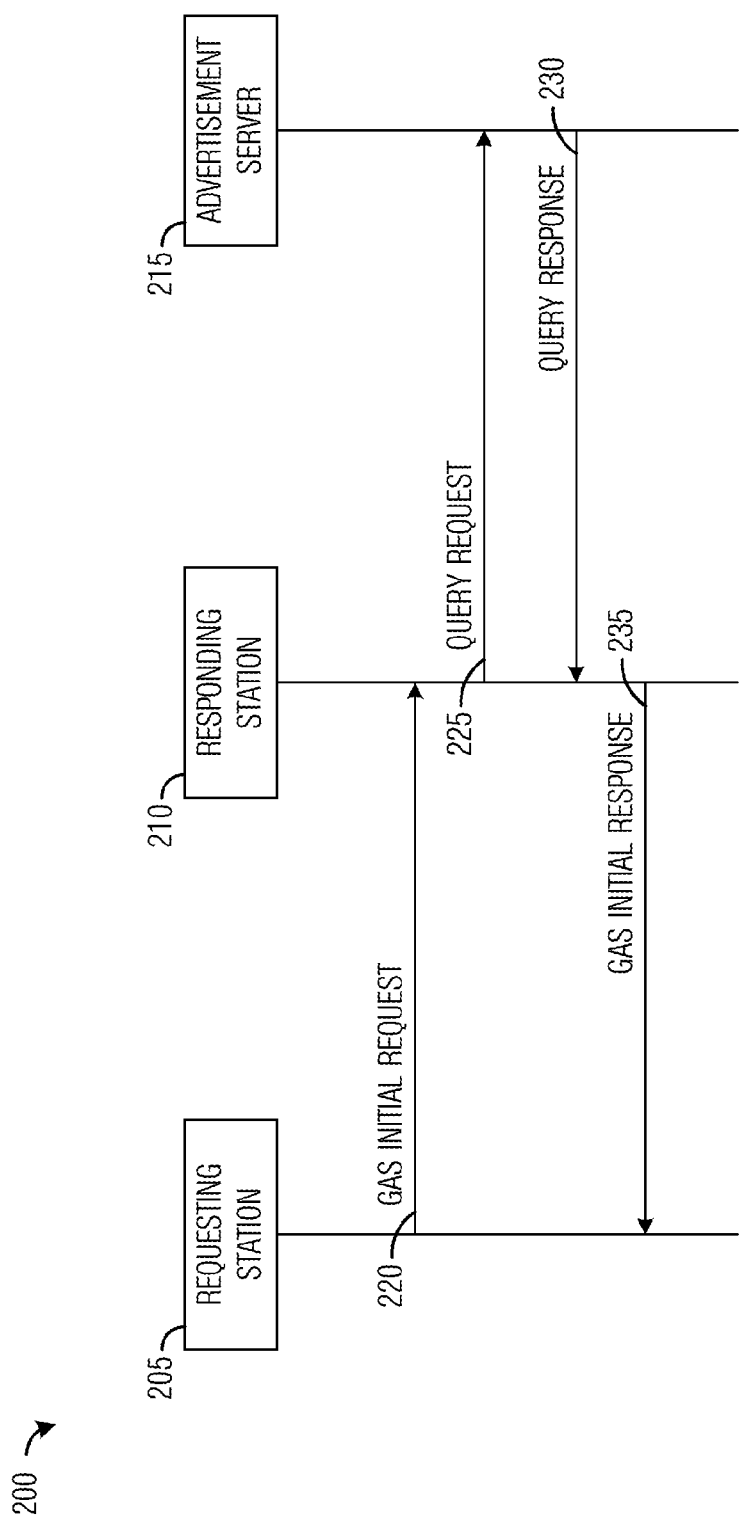
FIG. 2 illustrates an example message exchange diagram between entities in a communications system involving GAS messages according to example embodiments described herein.

FIG. 2 illustrates an example message exchange diagram 200 between entities in a communications system involving GAS messages. Message exchange diagram 200 includes messages exchanged between a requesting station 205 (such as a device), a responding station 210 (such as an AP, a serving AP, and the like), and an advertisement server 215. Message exchange diagram 200 may illustrate messages changed in a GAS message sequence with the dot11InterworkingServiceActivated parameter set to true. The presence of the interworking indication (dot11-InterworkingServiceActivated) in beacon and/or probe response frames indicates that advertisement protocol is supported in BSS or independent BSS (IBSS).

Requesting station 205 may send a GAS query request in a GAS initial request frame to responding station 210 (shown as event 220). Responding station 210 may forward the GAS query request to advertisement server 215 (shown as event 225). Advertisement server 215 may respond to the GAS query request with a GAS query response or information pertaining on how to receive the GAS query response (shown as event 230). Responding station 210 may forward the GAS query response or the information pertaining on how to receive the GAS query response to requesting station 205 in a GAS initial response frame (shown as event 235).

It is noted that the GAS query response may be delivered in a single GAS initial response frame or in one or more GAS comeback response frames. Furthermore, the GAS query response is not split between the GAS initial response frame and the one or more GAS comeback response frames.

A query list ANQP element may be used by a requesting station, such as requesting station 205, to perform an ANQP query that includes information identifiers (information IDs) that are of type S. A responding station, such as responding station 210, that encounters an unknown or reserved information ID in an ANQP query received without error may ignore the unknown or reserved information ID and processes any remaining information IDs. While, a capability list ANQP element may provide a list of information and/or capabilities configured on a station. The capability list ANQP element may be returned in response to a query list ANQP element containing the information ID of the capability list ANQP element.

Figure 3A:
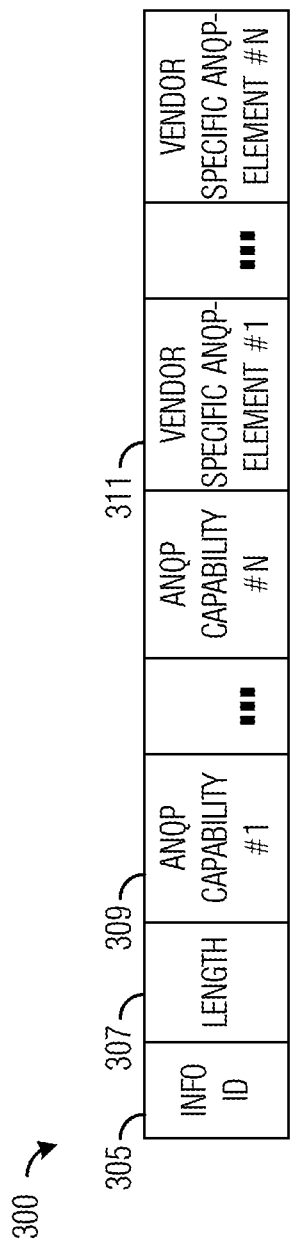
FIG. 3a illustrates an example capability list ANQP element according to example embodiments described herein.

FIG. 3a illustrates an example capability list ANQP element 300. Capability list ANQP element 300 may include an information ID field 305 to convey the information identifier of capability list ANQP element 300, and a length field 307 to convey the length of capability list ANQP element 300. Capability list ANQP element 300 may also include N ANQP capabilities, such as ANQP capability #1 309, and N vendor specific ANQP elements, such as vendor specific ANQP element #1 311.

A neighbor report request may be sent to an AP, which returns a neighbor report containing information about known neighbor APs that are candidates for a service set transition. Neighbor reports may contain information from a dot11RMNeighborReportTable in a management information block (MIB) concerning neighbor APs. The station may be able to obtain information about neighbors of its associated AP for use as potential roaming candidates.

Figure 3B:
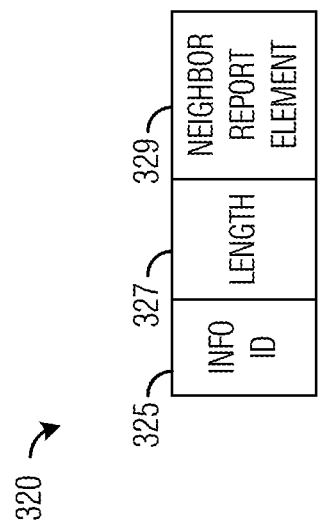
FIG. 3b illustrates an example neighbor report ANQP element according to example embodiments described herein.

FIG. 3b illustrates an example neighbor report ANQP element 320. Neighbor report ANQP element 320 includes an information ID field 325 to convey the information identifier of neighbor report ANQP element 320, and a length field 327 to convey the length of neighbor report ANQP element 320. Neighbor report ANQP element 320 also includes zero or more neighbor reports. As shown in FIG. 3b, neighbor report ANQP element 320 includes one neighbor report 329.

Figure 3C:
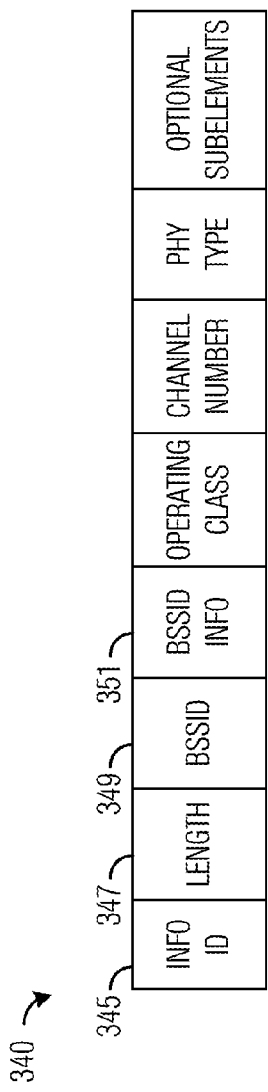
FIG. 3c illustrates an example neighbor report according to example embodiments described herein.
Figure 3D:
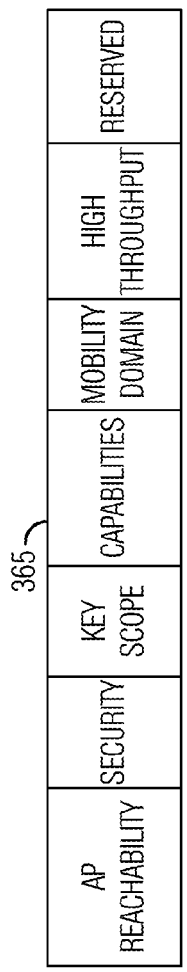
FIG. 3d illustrates an example BSSID information field according to example embodiments described herein.

FIG. 3c illustrates an example neighbor report 340. Neighbor report 340 includes an information ID field 345 to convey the information identifier of neighbor report 340, and a length field 347 to convey the length of neighbor report 340. A basic SSID (BSSID) may be included in a BSSID field 349 and conveys the BSSID of the BSS being reported. Subsequent fields of neighbor report 340 pertain to the BSS. BSSID information field 351 includes information about the BSS and may be used to determine neighbor set transition candidates. FIG. 3d illustrates a BSSID information field 360. BSSID information field 360 includes amongst other things, a capabilities field 365 used to indicate the capabilities of an AP associated with the BSSID.

Figure 3E:
FIG. 3e illustrates an example capabilities field according to example embodiments described herein.

FIG. 3e illustrates an example capabilities field 380. Capabilities field 380 contains selected capability information for the AP associated with the BSSID. As an example, capabilities field 380 may include information about the AP such as frame format (spectrum management), Quality of Service (QoS), automatic power save delivery (APSD), radio measurement format (radio measurement), delayed and immediate block acknowledgments (delayed block ack and immediate block ack). The fields in capabilities field 380 may have equivalent meaning and equivalent bit values with a capabilities information field sent in beacons transmitted by the AP.

Figure 4:
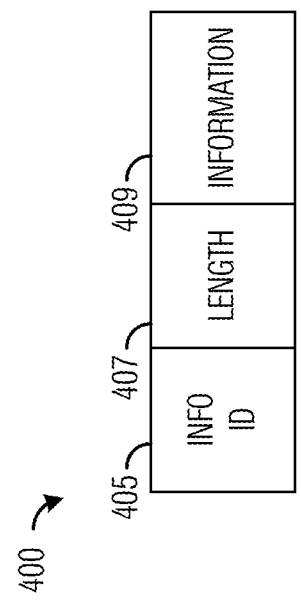
FIG. 4 illustrates an example ANQP element according to example embodiments described herein.

FIG. 4 illustrates an example ANQP element 400. ANQP element 400 includes an information ID field 405 to convey the information identifier of ANQP element 405, and a length field 407 to convey the length of ANQP element 405. ANQP element 400 may be assigned a unique information identifier. ANQP elements, such as ANQP element 405, may be configured as listed in Table 8-184 of IEEE 802.11-2012 technical specifications, which is incorporated herein by reference. If information is not configured for a particular ANQP element, then a query for that ANQP element returns an element with absent optional fields.

In general, a requesting station requests a neighbor report from an AP by sending a neighbor report request frame to its associated AP. If parameter dot11RMNeighborReportActivated is set to true, an AP receiving a neighbor report request frame responds with a neighbor report response frame containing zero or more neighbor report elements. If an SSID element is specified in the neighbor report request frame, the neighbor report element(s) may contain information only concerning neighbor APs that are members of the current extended service set (ESS) identified by the SSID element. If the SSID element is omitted, the neighbor report element(s) may contain information concerning all neighbor APs. If there are no neighbor APs, the AP sends a neighbor report response frame with no neighbor report elements.

If parameter dot11RMNeighborReportActivated is set to false, the AP ignores the neighbor request frame and returns a neighbor report frame with an incapable bit in a measurement report mode field set to 1. A station receiving a neighbor report element with an unknown subelement identifier may ignore the unknown subelement and continue to process remaining subelements. A station receiving a neighbor report element containing a vendor specific subelement with an unknown organization identifier may ignore the vendor specific subelement and continue to process remaining vendor specific subelements. A serving AP may include a timer synchronization function (TSF) information subelement in a neighbor report element if it is able to guarantee an accumulated error of 1.5 time units (TU) or less on the TSF offset subfield. Otherwise, the serving AP does not include a TSF information subelement in the neighbor report element.

Generally, a device cannot obtain ANQP information for more than one AP, and since there is typically no interface between an ANQP server and the device, the device can usually obtain the ANQP information only for an AP using an air interface between itself and the AP. Without the use of the air interface, the device normally cannot obtain ANQP information.

According to an example embodiment, the device may be able to obtain ANQP information for more than one AP using a single composed ANQP query (or simply composed query). A composed query may be a query that is a logical combination of two or more ANQP attributes and/or values. In other words, the composed query is a logical combination of criteria (ANQP attributes and/or values) that may be used to retrieve ANQP information for stations satisfying the logical combination of criteria. Examples of logical combinations include AND, OR, NAND, NOR, NOT, XOR, XNOR, and the like. Other examples of logical combinations include IN, OUT, EXCEPT, INCLUDING, EXCLUDING, and the like. As an example, a composed query may specify "send a list of all ANQP attributes associated with a following list of BSSIDs AND has a WAN throughput greater than a threshold". Obtaining ANQP information for more than one AP using a single composed query may eliminate the device from having to probe multiple APs using multiple GAS query requests, with one GAS query request per probe of an AP. The reduction in GAS query requests and corresponding GAS query responses may reduce communications overhead as well as probability of transmission collisions, thereby improving overall communications system performance, reducing scanning latency, and the like.

According to an example embodiment, the composed ANQP may be sent in a GAS query request by a requesting station, such as a device, to a responding station, such as an AP. The responding station may parse the composed query and provide information, such as ANQP information of APs satisfying the composed query, identifying information (e.g., BSSIDs) of APs satisfying the composed query, or a combination thereof, to the requesting station in a GAS query response. The responding station may have some or all of the ANQP information stored locally. Alternatively, the responding station may access a remote server or database to retrieve at least some of the ANQP information of APs satisfying the composed query. Alternatively, the responding station may access the APs satisfying the composed query to retrieve at least some of the ANQP information of APs satisfying the composed query. Alternatively, the responding station may utilize a combination of some or all of the above to obtain the ANQP information for the requesting station.

According to an example embodiment, the composed query may be transmitted in a GAS query request before the requesting station becomes associated with an AP. According to an example embodiment, the composed query may be transmitted in a GAS query request after the requesting station becomes associated with an AP.

According to an example embodiment, an indicator, a neighbor provisioning information (NPI) indicator, for example, may be signaled by an AP in a beacon or a probe response to indicate support for internetworking and ANQP. The presence of the NPI indicator indicating support for internetworking and ANQP may be interpreted as the AP being able to provide information (such as ANQP information, identifying information (e.g., BSSIDs), and the like) for its neighbors in addition to itself. Furthermore, when the NPI indicator indicates support for internetworking and ANQP, the AP may optionally present in beacons or probe responses a list of BSSIDs of neighbor APs of which it has information. Additionally, the beacon or probe response may also include a sequence number to identify the freshness of the information for each of its neighbors in the list of BSSIDs.

A requesting station that receives a beacon or probe response with the NPI indicator indicating support for internetworking and ANQP may transmit a GAS query request for all or a subset of the neighbors in the list of BSSIDs with the subset being specified in accordance with the composed query. Alternatively, the requesting station may utilize the sequence under that identifies the freshness of the information for one or more neighbors for the neighbors in the list of BSSIDs to determine whether or not to request information associated with the one or more neighbors.

Figure 5A:
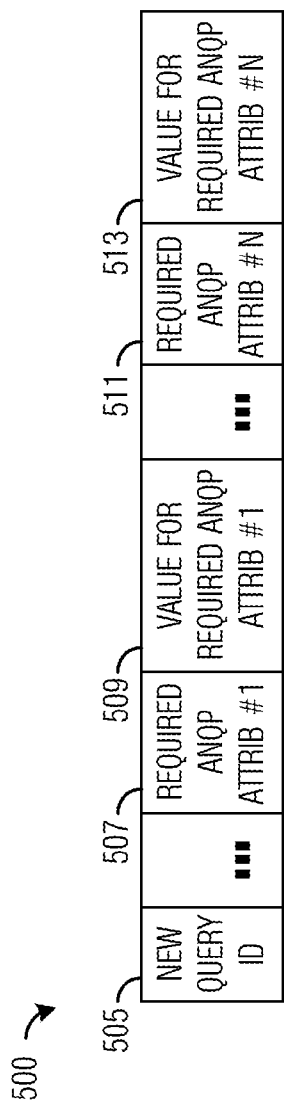
FIGS. 5a and 5b illustrate example composed queries according to example embodiments described herein.

FIG. 5a illustrates an example first composed query 500. First composed query 500 includes a new query ID field 505 to convey a query identifier of first composed query 500. First composed query 500 also includes up to N ANQP attributes and ANQP attribute values, such as ANQP attribute #1 507 and value of ANQP attribute #1 509, and ANQP attribute #N 511 and value of ANQP attribute #N 513.

Figure 5B:
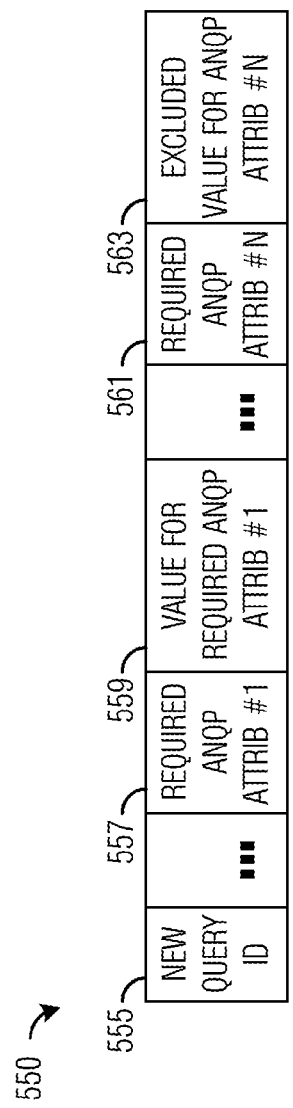

FIG. 5b illustrates an example second composed query 550. Second composed query 550 includes a new query ID field 555 to convey a query identifier of second composed query 550. Second composed query 550 also includes up to N ANQP attributes and ANQP attribute values, such as ANQP attribute #1 557 and value of ANQP attribute #1 559, and ANQP attribute #N 561 and excluded value of ANQP attribute #N 563. It is noted that excluded value of ANQP attribute #N 563 may be a manifestation of a logical operation(s).

Additional fields may be added to the neighbor reports. As an illustrative example, information ANQP Capability is Neighbor Report (Info ID=272). When an AP receives a composed query it replies with an Enhanced Neighbor Report where the following elements are added to those presented in FIG. 6:

Interworking support indication;
Hotspot2 support indication;
Optional Elements—the ANQP attributes as described in FIG. 9; and
Optional Elements—the additional ANQP attributes as described in the Hotspot 2.0 (Release 2).

An Enhanced Neighbor List contains the list of neighboring APs that have ANQP attributes that match the composed query. An AP is identified in the returned list via its BSSID or SSID or HESSID information.

FIGS. 5a and 5b illustrate two example composed queries. Many other different formats are possible, so the illustration of the two composed queries should not be construed as being limiting to either the scope or the spirit of the example embodiments.

According to an example embodiment, in a situation when a beacon or probe response does not include the list of BSSIDs, a requesting station may transmit a GAS query request including a composed query to ask for a list of BSSIDs. The composed query may request a list of all BSSIDs that are neighbors of a responding station or it may request a filtered list of BSSIDs selected from all BSSIDs that are neighbors of the responding station. As an illustrative example, the composed query may include "provide BSSIDs for all neighbor stations", or "provide ANQP attributes associated with the following list of BSSIDs".

Similarly, registered location query protocol (RLQP) is another advertisement protocol that may be used between geolocation database dependent (GDD) enabling stations and GDD dependent stations to share a white space map and channel utilization information. RLQP may include elements that are similar to ANQP elements. RLQP may be used in conjunction with GAS. Refer to IEEE P802.11af/D2.0 "Part 11: Wireless LAN Medium Access Control (MAC) and Physical Layer (PHY) specifications; Amendment 5: TV White Spaces Operation," Section 8.4.5 Registered Location Query Protocol Elements, which is incorporated herein by reference, for a detailed discussion of RLQP elements, including attributes and associated values. Hence, the example embodiments presented herein may be operable with RLQP attributes and associated values. Furthermore, the example embodiments presented herein may be operable with additional advertisement protocols that can be used in conjunction with GAS, such as service discovery protocols, and the like.

Figure 6A:
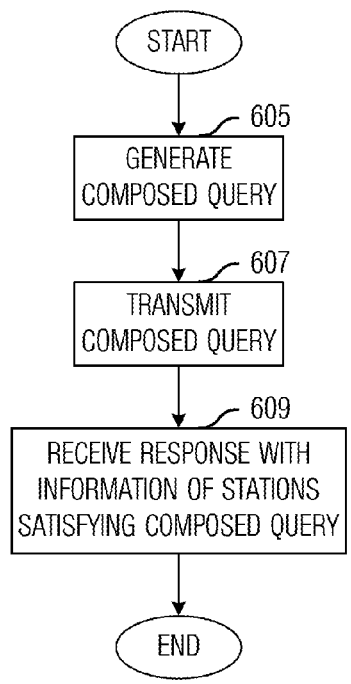
FIG. 6a illustrates an example flow diagram of first operations occurring in a requesting station as the requesting station uses a composed query to request information for a plurality of APs according to example embodiments described herein.

FIG. 6a illustrates an example flow diagram of first operations 600 occurring in a requesting station as the requesting station uses a composed query to request information for a plurality of APs. Operations 600 may be indicative of operations occurring in a requesting station, such as requesting station 205, devices 105, 107, and 109, and the like, as the request station uses a composed query to request information for a plurality of APs.

Operations 600 may begin with the requesting station generating a composed query (block 605). As discussed previously, the composed query may include a logical combination of ANQP attributes and/or values, RLQP attributes and/or values, and/or service discovery protocol attributes and/or values. The requesting device may transmit the composed query to a responding station in a GAS query request (block 607). The requesting device may receive a GAS query response that includes information of stations, e.g., APs, which satisfy the composed query (block 609). According to an example embodiment, the information of stations includes ANQP information of the stations that satisfy the composed query. Generally, the stations that satisfy the composed query make up a subset of neighbor stations of the responding station. According to an example embodiment, the information of stations includes identifying information of the stations that satisfy the composed query. According to another example embodiment, the information of stations includes a list of stations that satisfy the composed query.

Figure 6B:
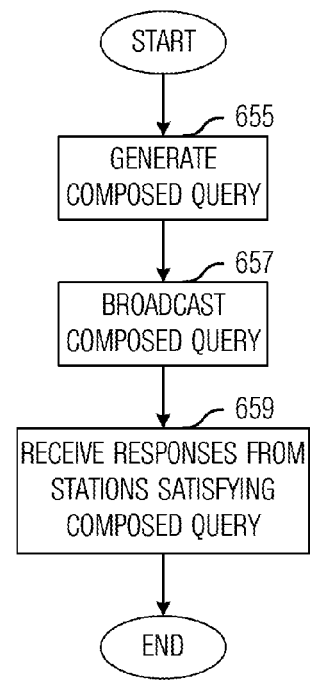
FIG. 6b illustrates an example flow diagram of second operations occurring in a requesting station as the requesting station uses a composed query to request information for a plurality of APs according to example embodiments described herein.

FIG. 6b illustrates an example flow diagram of second operations 650 occurring in a requesting station as the requesting station uses a composed query to request information for a plurality of APs. Operations 650 may be indicative of operations occurring in a requesting station, such as requesting station 205, devices 105, 107, 109, and the like, as the request station uses a composed query to request information for a plurality of APs.

Operations 650 may begin with the requesting station generating a composed query (block 655). As discussed previously, the composed query may include a logical combination of ANQP attributes and/or values, RLQP attributes and/or values, and/or service discovery protocol attributes and/or values. The requesting device may broadcast the composed query to a plurality of responding stations in a GAS query request (block 657). The requesting device may receive a GAS query response from a subset of the plurality of stations that satisfies the composed query (block 659). According to an example embodiment, the information in each GAS query response includes ANQP information for the responding station. According to another example embodiment, the information in each GAS query response includes identifying information for the responding information. According to another example embodiment, the information in each GAS query response includes a list of stations.

According to an example embodiment, a requesting station may query about ANQP information for multiple stations at the same time. This technique may be focused mainly on network discovery and selection in Hotspots or service discovery in WiFi networks. As an illustrative example, the composed query may be sent to a serving station that can provide its neighbor's ANQP information. It is noted that this is different from a neighbor report request sent to an associated AP.

Figure 7A:
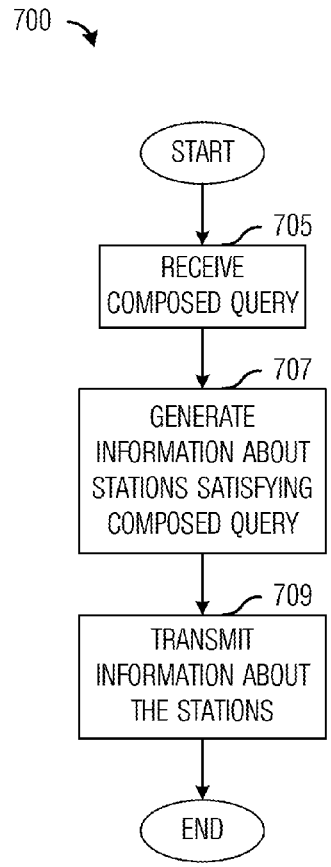
FIG. 7a illustrates an example flow diagram of operations occurring in a responding station as the responding station provides information for one or more APs satisfying a composed query according to example embodiments described herein.
Figure 7B:
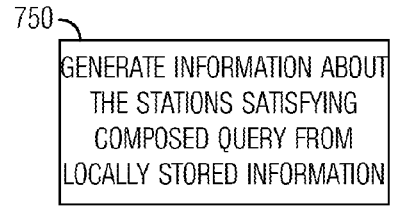
FIGS. 7b-7e illustrate multiple example embodiments for generating information of stations that satisfy the composed query according to example embodiments described herein.
Figure 7C:
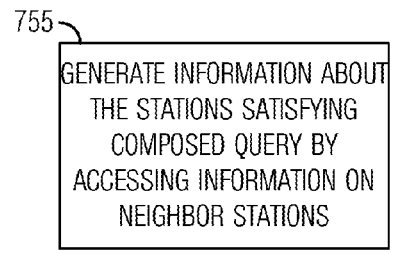
Figure 7D:
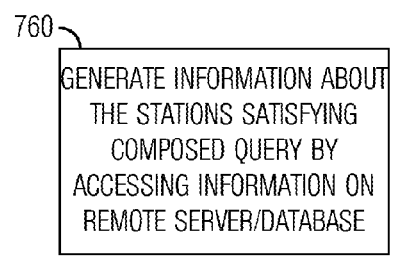
Figure 7E:
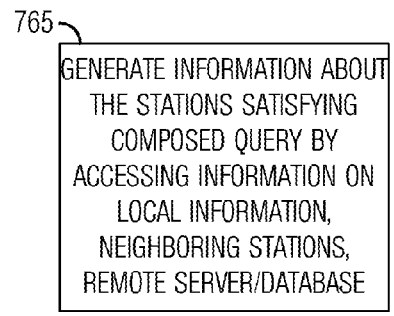

FIG. 7a illustrates an example flow diagram of operations 700 occurring in a responding station as the responding station provides information for one or more APs satisfying a composed query. Operations 700 may be indicative of operations occurring in a responding station, such as an AP, an ANQP server, and the like, as the responding station provides information for one or more APs satisfying a composed query.

Operations 700 may begin with the responding station receiving a composed query (block 705). According to an example embodiment, if the responding station is receiving the composed query from a requesting station, the composed query may be received in a GAS query request, while if the responding station is an ANQP server, the composed query may be received from an intermediary station in a simple message format. The responding station may generate information of stations, e.g., APs, which satisfy the composed query (block 707). The information of stations may include ANQP information of the stations, identifying information, a list of the stations, or a combination thereof. Generally, the stations that satisfy the composed query make up a subset of neighbor stations of the responding station. The responding station may transmit the information of the stations (block 709). According to an example embodiment, if the responding station received the composed query from the requesting station, the information may be transmitted back to the requesting station in a GAS query response, while if the responding station is an ANQP server, the responding station may send the information to the intermediary station in a simple message format. If in the end, the responding station cannot provide the requested information, it may respond to the requesting station with a message showing that it failed to provide the information, and a failure reason, which may include: no such neighbor station, no cached information, time out, and the like, for example.

FIGS. 7b-7e illustrate multiple example embodiments for generating information of stations that satisfy the composed query. According to a first example embodiment, the responding station may generate the information from locally stored information (shown as block 750 of FIG. 7b). The responding station may have stored in a local information store, e.g., its memory, cache, or a combination thereof, information about its neighbor stations. The information about its neighbor stations may also be stored locally in a local ANQP server or an ANQP cache. The responding station stores locally the ANQP information related to its neighbor stations. The ANQP information may be updated periodically using requests from the responding station sent to the neighbor stations or to an information server, such as an ANQP server, or as per event based using event triggered updates from the neighboring stations.

According to a second example embodiment, the responding station may generate the information by accessing information stored at its neighbor stations. The responding station may request the information from its neighbor stations that satisfy the composed query (shown as block 755 of FIG. 7c). The responding station may also tunnel the composed query to its neighboring stations over a distribution system (DS) using an AP to AP communications, in a way similar to a Fast Transition Protocol, for example. The neighbor stations may or may not be part of the same network as the responding station.

Generally, ANQP information may be divided into common ANQP information and specific ANQP information. The common ANQP information is that information that is common to several neighbor stations, while the specific ANQP information is the information that is specific to an individual station. When receiving a request for ANQP information of neighbor stations, an AP may send just one copy of common ANQP information for all neighbor APs.

If responding station does not maintain local ANQP information about its neighboring stations, the responding station sends the composed ANQP request to each neighboring station. When sending a request to neighboring stations, the responding station may start a timer for receiving all the responses from its neighbor stations. After the timer expiration, the responding station sends back the information received from its neighbor stations to the requesting station. Alternatively, the responding station sends the received information from the neighboring station(s) as soon as it receives it. The requesting station may be able to stop the responding station from sending more information on its neighbors at any time based on the information received so far.

According to a third example embodiment, the responding station may generate the information by accessing information stored at a remotely located information store, e.g., a remote server and/or database. The responding station may request the information from a remotely located server and/or database (shown as block 760 of FIG. 7*d*). The remotely located server and/or database, such as an ANQP server and/or database, may or may not be part of the same network as the responding station. The remotely located server and/or database may store information of a plurality of stations and select a subset of the plurality of stations in accordance with the composed query. The remotely located server and/or database may include a plurality of remotely located server and/or database that are capable of interfacing one another and share information in accordance with the composed query. The remotely located server and/or database may interface with entities of other networks, such as an access network discovery and selection function (ANDSF) server from a 3GPP network, and request information in accordance with the composed query.

According to a fourth example embodiment, the responding station may utilize a combination of accessing local information, requesting the information from neighbor stations, and accessing a remotely located server and/or database. The responding station may use a combination of locally stored information, information stored at its neighbor stations, and information stored at a remotely located server and/or database (shown as block 765 of FIG. 7*e*).

Figure 8:
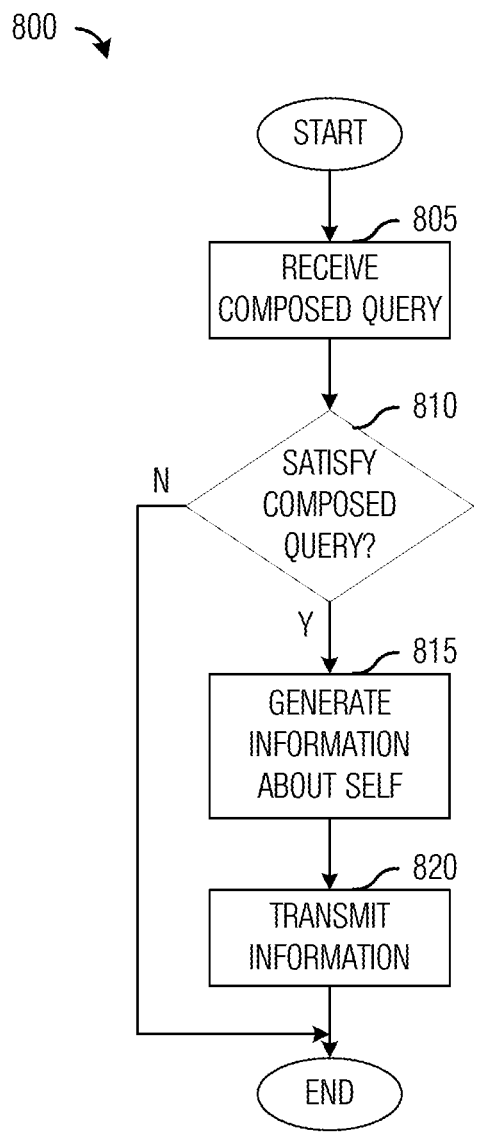
FIG. 8 illustrates an example flow diagram of operations occurring in a responding station as the responding station provides information about itself in response to a received composed query according to example embodiments described herein.

FIG. 8 illustrates an example flow diagram of operations 800 occurring in a responding station as the responding station provides information about itself in response to a received composed query. Operations 800 may be indicative of operations occurring in a responding station, such as an AP, an ANQP server, and the like, as the responding station provides information about itself if it satisfies a received composed query.

Operations 800 may begin with the responding station receiving a composed query (block 805). According to an example embodiment, the composed query may have been broadcasted by a requesting station rather than being specifically addressed to the responding station. The responding station may perform a check to determine if it satisfies the composed query (block 810). The responding station may evaluate the composed query to determine if it satisfies the composed query, for example. If the responding station does satisfy the composed query, the responding station may generate information about itself (block 815) and transmit the information (block 820). The information may include ANQP information about the responding station, identifying information about the responding station, a list of stations, or a combination thereof. The information may be transmitted to the source of the composed query, e.g., a requesting station.

In addition to GAS query requests and GAS query responses, the example embodiments presented herein may be operable with other forms of request and response message pairs. As an illustrative example, probe attach requests and probe attach responses (or probe connection requests and probe connection responses) may be used. A first station may send a probe attach request (or probe connection request) message. The probe attach request message includes one or more condition parameters: a condition parameter could be one of SSID (or a list of SSIDs), an operator friendly name (or a list of friendly names), an operator ID (or a list of operator IDs), a BSSID (or a list of BSSIDs), a public land mobile network (PLMN) ID (or a list of PLMN IDs), a network capability (for example, quality of service (QoS), multiple-input multiple output (MIMO), antenna number, bandwidth, load level, fast initial link setup, and the like), an authentication method (e.g., a condition parameter that indicates that the authentication method is extensible authentication protocol (EAP) or wired equivalent privacy (WEP) or Open), a base station ID (or a list of base station IDs), or a combination thereof. The list presented herein is an exemplification only, and other parameters could be included in the probe attach request message.

When a second station (for instance an AP or a base station) receives the probe attach request message, it may check to determine whether it satisfies the condition. As an illustrative example, if the condition parameter is an SSID value, the second station checks whether its SSID is the same as the SSID value in the condition parameter (while if the condition parameter is a list of SSIDs, the second station checks whether its SSID is in the list of SSIDs). If its SSID is the same as the SSID (or belongs in the list), the second station responds with a message (which may be named probe attach response), which may include the second station's ID (or address), an indicator showing that it allows the first station to attach (or to connect) (or an indicator showing it satisfies the condition and to process the next step). When receiving such a probe attach response, the first station may response with a confirmation message (which may be named probe attach confirmation) to the second station to confirm the receiving of the response message.

When the first station receives more than one probe attach responses from different stations (this would happen when several stations satisfy the condition in the message and they all respond to the first station), the first station may select one of them and respond with a confirmation message to the selected station. The first station may also send a message to each of the unselected stations (or a broadcast message to all of them) to indicate that they are not selected. Alternatively, the first station may not send messages to the unselected stations and the unselected stations simply wait for a timer to expire. If the timer expires before a confirmation message is received, the unselected stations will consider themselves as unselected, and behave appropriately.

In addition to the condition parameter, the probe attach request could also include an authentication start request (and may also include some security parameters, or itself is an authentication start message and includes condition parameter). When the second station receives the request, it may start the authentication procedure if it satisfies the condition and decides to proceed. In this case, the probe attach response may also contain security parameters to continue the authentication procedure, while the probe attach confirmation may include an association request and/or other authentication information. Detailed information about authentication and security parameters is described in detail in IEEE 802.11-2007 standards specification or later versions, or IETF-related specs, which are incorporated herein by reference.

Furthermore, the probe attach request may include an association request (detailed information about association response can be referred to in 802.11-2007 specification or later versions) or a connection request (detailed information about connection request is described in detail in 3GPP TS25.331 or TS36.331, which are incorporated herein by reference). The probe attach response include an association response (detailed information about association response is described in detail in 802.11-2007 specification or later versions) or a connection response (detailed information about connection request is described in detail in 3GPP TS25.331 or TS36.331).

Also, the probe attach request may include an open system authentication condition and an association request, while the probe attach response may include an association response and authentication confirmation information. The detailed of association information and authentication information is described in detail in 802.11-2007 specification or later versions, or IETF-related specs.

Figure 9:
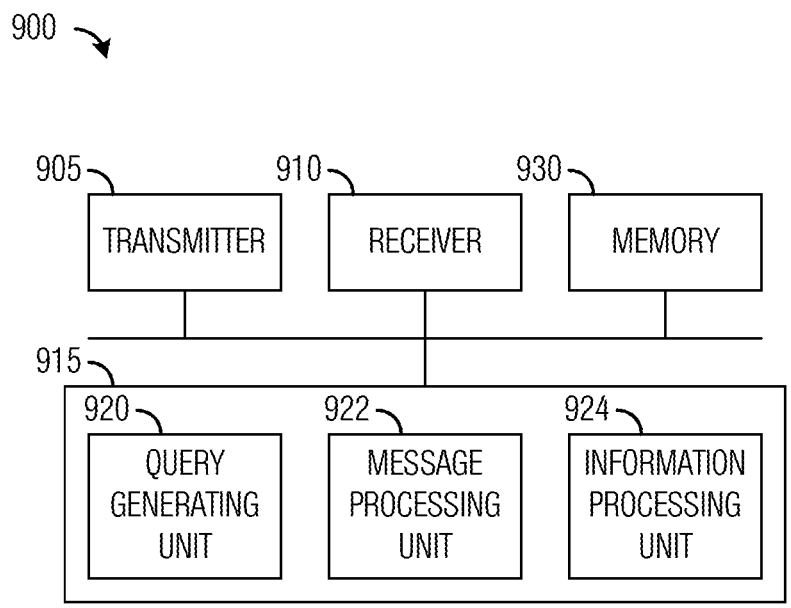
FIG. 9 illustrates an example first communications device according to example embodiments described herein.

FIG. 9 illustrates an example first communications device 900. Communications device 900 may be an implementation of a requesting device, such as a station, a user equipment, a terminal, a subscriber, a mobile station, and the like. Communications device 900 may be used to implement various ones of the embodiments discussed herein. As shown in FIG. 9, a transmitter 905 is configured to transmit packets, composed queries, GAS query requests, and the like. Communications device 900 also includes a receiver 910 that is configured to receive packets, information, GAS query responses, and the like.

A query generating unit 920 is configured to generate composed queries by logically combining two or more ANQP attributes and/or values, RLQP attributes and/or values, and/or service discovery protocol attributes and/or values. A message processing unit 922 is configured to generate a GAS query request that includes a composed query. The GAS query request is transmitted to one or more responding stations to obtain information about APs. Message processing unit 922 is configured to process received GAS query responses that include information about APs to extract the included information. An information processing unit 924 is configured to process the information about the APs received from responding stations. A memory 930 is configured to store packets, composed queries, GAS query requests, GAS query responses, information about APs, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while query generating unit 920, message processing unit 922, and information processing unit 924 may be software modules executing in a microprocessor (such as processor 915) or a custom circuit or a custom compiled logic array of a field programmable logic array. Query generating unit 920, message processing unit 922, and information processing unit 924 may be modules stored in memory 930.

Figure 10:
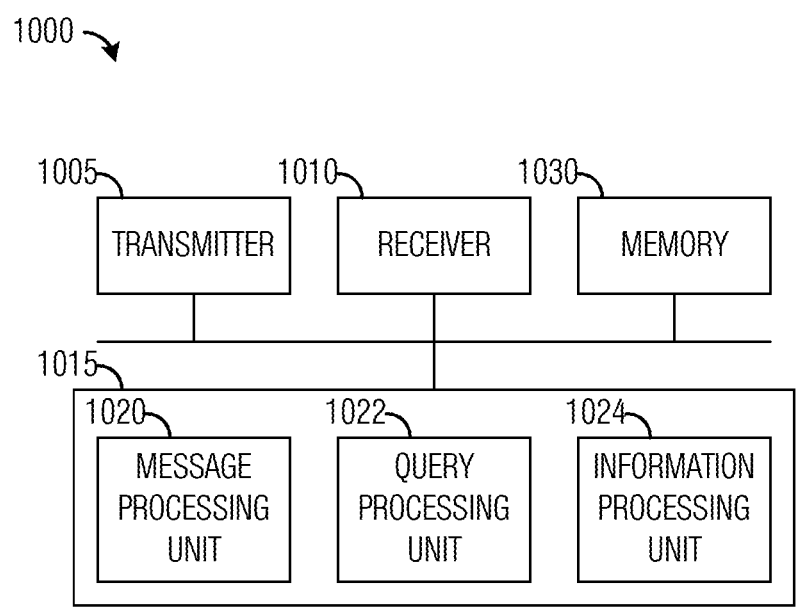
FIG. 10 illustrates an example second communications device according to example embodiments described herein.

FIG. 10 illustrates an example second communications device 1000. Communications device 1000 may be an implementation of a responding device, such as an AP, an ANQP server, and the like. Communications device 1000 may be used to implement various ones of the embodiments discussed herein. As shown in FIG. 10, a transmitter 1005 is configured to transmit packets, GAS query responses, information about AP(s), and the like. Communications device 1000 also includes a receiver 1010 that is configured to receive packets, composed queries, GAS query requests, and the like.

A message processing unit 1020 is configured to process received GAS query requests that include a composed query. Message processing unit 1020 is configured to generate a message that includes the composed query to be sent to a neighbor AP, or a server and/or database. A query processing unit 1022 is configured to evaluate the composed query to determine AP(s) that satisfy the composed query. An information processing unit 1024 is configured to process the information about the APs received from neighbor stations or a server and/or database. A memory 1030 is configured to store packets, composed queries, GAS query requests, GAS query responses, information about APs, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while message processing unit 1020, query processing unit 1022, and information processing unit 1024 may be software modules executing in a microprocessor (such as processor 1015) or a custom circuit or a custom compiled logic array of a field programmable logic array. Message processing unit 1020, query processing unit 1022, and information processing unit 1024 may be modules stored in memory 1030.

The example embodiment discussed herein may be implemented in wireless access networks and compatible devices, such as Wi-Fi mobile devices supporting Hotspot 2.0 and ANQP server, Wi-Fi stations, Wi-Fi access points, ANQP servers, RLQP servers, service discovery protocol servers, and the like.

Although the present disclosure and its advantages have been described in detail, it should be understood that various changes, substitutions and alterations can be made herein without departing from the spirit and scope of the disclosure as defined by the appended claims.

What is claimed is:

1. A method for wireless communications, the method comprising:
generating, by a requesting station, a composed query for obtaining information about a subset of a plurality of neighboring stations of an access point which satisfy criteria indicated by the composed query, the composed query including a logical combination of attributes and values, the attributes being selected by the requesting station, the attributes and the values arranged in respective pairs, each of the respective pairs including a respective attribute of the attributes and a respective value of the values corresponding to the respective attribute, the logical combination of the attributes and the values further comprising logical operators indicating whether the respective value of each of the respective pairs is an included value or an excluded value for the respective attribute in the criteria that the subset of the plurality of neighboring stations satisfy;
transmitting, by the requesting station, the composed query to the access point;

receiving, by the requesting station, the information from the access point, the information indicating the subset of the plurality of neighboring stations that satisfy the criteria in the composed query, the subset of the plurality of neighboring stations that satisfy the criteria including neighboring stations with attributes satisfying the included values for the criteria and excluding neighboring stations with attributes satisfying the excluded values for the criteria;

selecting, by the requesting station, a neighbor station from the subset of the plurality of neighboring stations indicated by the information received; and initiating, by the requesting station, an association procedure with the neighbor station.

2. The method of claim 1, wherein the composed query comprises a logical combination of access network query protocol (ANQP) attributes and associated ANQP values, registered location query protocol (RLQP) attributes and associated RLQP values, and a service discovery protocol and its associated values.

3. The method of claim 1, wherein the information further comprises at least one of ANQP information about the subset of the plurality of neighboring stations that satisfy the composed query, and identifying information of the subset of the plurality of neighboring stations that satisfy the composed query.

4. The method of claim 1, wherein the composed query is transmitted in a generic advertisement service (GAS) query request message.

5. The method of claim 4, wherein the information is received in a generic advertisement service (GAS) query response message.

6. The method of claim 1, further comprising:
selecting a neighbor station in accordance with the information; and
transmitting an inquiry to the neighbor station.

7. The method of claim 1, wherein the logical combination of attributes and associated values includes attributes and associated values for a plurality of advertisement protocols, each of the plurality of advertisement protocols used to discover features or services available to the requesting station from the access point and the plurality of neighboring stations, the plurality of advertisement protocols selected from a group including at least: access network query protocol (ANQP), registered location query protocol (RLQP), and service discovery protocol.

8. The method of claim 1, wherein the attributes identify elements of one or more advertisement protocols.

9. The method of claim 8, wherein at least one of the attributes identifies an access network query protocol (ANQP) element.

10. A method for wireless communications, the method comprising:
receiving, by an access point, a composed query for obtaining information about a subset of a plurality of neighboring stations of the access point which satisfy criteria indicated by the composed query, the composed query including a logical combination of attributes and values, the attributes identifying elements of one or more advertisement protocols, the attributes being selected by a requesting station, the attributes and the values arranged in respective pairs, each of the respective pairs including a respective attribute of the attributes and a respective value of the values corresponding to the respective attribute, the logical combination of the attributes and the values further comprising logical operators indicating whether the respective value of each of the respective pairs is an included value or an excluded value for the respective attribute in the criteria that the subset of the plurality of neighboring stations satisfy;

generating, by the access point, the information, the information indicating the subset of the plurality of neighboring stations that satisfy the criteria in the composed query, the subset of the plurality of neighboring stations that satisfy the criteria including neighboring stations with attributes satisfying the included values for the criteria and excluding neighboring stations with attributes satisfying the excluded values for the criteria; and transmitting, by the access point, the information to the requesting station.

11. The method of claim 10, further comprising storing neighbor information about a plurality of neighboring stations including the subset of the plurality of neighboring stations in a local information store, and wherein generating the information comprises retrieving the information from the local information store.

12. The method of claim 10, wherein generating the information comprises:
forwarding the attributes, the values, and the logical operators in the composed query to a plurality of neighboring stations including the subset of the plurality of neighboring stations; and
receiving the information from the subset of the plurality of neighboring stations.

13. The method of claim 10, wherein generating the information comprises:
forwarding the attributes, the values, and the logical operators in the composed query to a database, the database being in a first network, the access point being in a second network different from the first network; and
receiving the information from the database.

14. The method of claim 10, wherein the information is transmitted to the requesting station in a generic advertisement service (GAS) query response message.

15. The method of claim 14, wherein the composed query is received in a generic advertisement service (GAS) query request message.

16. The method of claim 10, wherein the logical combination of attributes and associated values includes attributes and associated values for a plurality of advertisement protocols, each of the plurality of advertisement protocols used to discover features or services available to the requesting station from the access point and the plurality of neighboring stations, the plurality of advertisement protocols selected from a group including at least: access network query protocol (ANQP), registered location query protocol (RLQP), and service discovery protocol.

17. A requesting station comprising:
a processor configured to generate a composed query for obtaining information about a subset of a plurality of neighboring stations of an access point which satisfy criteria indicated by the composed query, the composed query including a logical combination of attributes and values, the attributes being selected by the processor, the attributes and the values arranged in respective pairs, each of the respective pairs including a respective attribute of the attributes and a respective value of the values corresponding to the respective attribute, the logical combination of the attributes and the values further comprising logical operators indicating whether the respective value of each of the respective pairs is an included value or an excluded value for the respective attribute in the criteria that the subset of the plurality of neighboring stations satisfy;

a transmitter operatively coupled to the processor, the transmitter configured to transmit the composed query to the access point; and a receiver operatively coupled to the processor, the receiver configured to receive the information from the access point, the information indicating the subset of the plurality of neighboring stations that satisfy the criteria in the composed query, the subset of the plurality of neighboring stations that satisfy the criteria including neighboring stations with attributes satisfying the included values for the criteria and excluding neighboring stations with attributes satisfying the excluded values for the criteria, the processor further configured to select a neighbor station from the subset of the plurality of neighboring stations indicated by the information received, the processor further configured to initiate an association procedure with the neighbor station.

18. The requesting station of claim 17, wherein the processor is configured to select a neighbor station in accordance with the information, and wherein the transmitter is configured to transmit an inquiry to the neighbor station.

19. The requesting station of claim 17, wherein the attributes identify elements of one or more advertisement protocols.

20. An access point comprising:

a receiver configured to receive a composed query for obtaining information about a subset of a plurality of neighboring stations of the access point which satisfy criteria indicated by the composed query, the composed query including a logical combination of attributes and values, the attributes identifying elements of one or more advertisement protocols, the attributes being selected by a requesting station, the attributes and the values arranged in respective pairs, each of the respective pairs including a respective attribute of the attributes and a respective value of the values corresponding to the respective attribute, the logical combination of the attributes and the values further comprising logical operators indicating whether the respective value of each of the respective pairs is an included value or an excluded value for the respective attribute in the criteria that the subset of the plurality of neighboring stations satisfy;

a processor operatively coupled to the receiver, the processor configured to generate the information, the information indicating the subset of the plurality of neighboring stations that satisfy the criteria in the composed query, the subset of the plurality of neighboring stations that satisfy the criteria including neighboring stations with attributes satisfying the included values for the criteria and excluding neighboring stations with attributes satisfying the excluded values for the criteria; and a transmitter operatively coupled to the processor, the transmitter configured to transmit the information to the requesting station.

21. The access point of claim 20, wherein the processor is configured to store neighbor information about a plurality of neighboring stations including the subset of the plurality of neighboring stations in a local information store, and to retrieve the information from the local information store.

22. The access point of claim 20, wherein the processor is configured to forward the attributes, the values, and the logical operators in the composed query to a plurality of neighboring stations including the subset of the plurality of neighboring stations, and wherein the receiver is configured to receive the information from the subset of the plurality of neighboring stations.

23. The access point of claim 20, wherein the processor is configured to forward the attributes, the values, and the logical operators in the composed query to a database, the database being in a first network, the access point being in a second network different from the first network, and wherein the receiver is configured to receive the information from the database.

* * * * *